(12) United States Patent
Hanaoka et al.

(10) Patent No.: US 8,479,045 B2
(45) Date of Patent: Jul. 2, 2013

(54) CONTROLLER FOR DISK ARRAY DEVICE, DATA TRANSFER DEVICE, AND METHOD OF POWER RECOVERY PROCESS

(75) Inventors: Yuji Hanaoka, Kawasaki (JP); Nina Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 12/929,613

(22) Filed: Feb. 3, 2011

(65) Prior Publication Data

US 2011/0138221 A1    Jun. 9, 2011

Related U.S. Application Data

(63) Continuation of application No. PCT/JP2008/064117, filed on Aug. 6, 2008.

(51) Int. Cl.
*G06F 11/00* (2006.01)
(52) U.S. Cl.
USPC .................................................. 714/22
(58) Field of Classification Search
USPC .................................................. 714/21, 22
See application file for complete search history.

(56) References Cited

U.S. PATENT DOCUMENTS

| 6,094,693 | A | 7/2000 | Haneda | |
|---|---|---|---|---|
| 6,934,879 | B2* | 8/2005 | Misra et al. | 714/6.12 |
| 7,654,466 | B2 | 2/2010 | Maeda et al. | |
| 7,821,824 | B2 | 10/2010 | Shinagawa et al. | |
| 8,117,391 | B2* | 2/2012 | Fujii et al. | 711/119 |
| 8,205,034 | B2* | 6/2012 | Matsumoto et al. | 711/103 |
| 2004/0059869 | A1* | 3/2004 | Orsley | 711/114 |
| 2005/0044448 | A1* | 2/2005 | Verdun | 714/22 |
| 2005/0219899 | A1* | 10/2005 | Kishi et al. | 365/185.11 |
| 2006/0221719 | A1* | 10/2006 | Maeda et al. | 365/189.05 |
| 2008/0104344 | A1* | 5/2008 | Shimozono et al. | 711/162 |
| 2009/0052238 | A1* | 2/2009 | Shinagawa et al. | 365/185.01 |

FOREIGN PATENT DOCUMENTS

| EP | 0 649 095 | 4/1995 |
|---|---|---|
| JP | 10-69420 | 3/1998 |
| JP | 2000-155655 | 6/2000 |
| JP | 2003-256266 | 9/2003 |
| JP | 2004-506256 | 2/2004 |
| JP | 2004-118837 | 4/2004 |
| JP | 2005-284998 | 10/2005 |

(Continued)

OTHER PUBLICATIONS

Patent Abstracts of Japan, Publication No. 2004-118837, Published Apr. 15, 2004.

(Continued)

*Primary Examiner* — Joshua Lohn
(74) *Attorney, Agent, or Firm* — Staas & Halsey LLP

(57) ABSTRACT

In a controller of a disk array device, when recovery from a power failure is detected, the controller instructs a reading section to transfer data in a burst mode using a large prefetch amount. When an error is detected, the controller causes the data to be transferred again for an area where the error is detected. Further, the controller designates different access ports for the reading section and an erasing section, and causes these sections to operate in parallel. The reading section reads cache data from a flash memory and stores the cache data in a cache memory. The erasing section uses the access port different from the access port of the reading section, to erase data that is stored in the flash memory and has been transferred by the reading section.

10 Claims, 12 Drawing Sheets

FOREIGN PATENT DOCUMENTS

| | | |
|---|---|---|
| JP | 7-114500 | 5/2008 |
| JP | 2008-108026 | 5/2008 |
| WO | WO 02/01365 | 1/2002 |
| WO | WO 2005/029311 | 3/2005 |
| WO | WO 2006/025091 | 3/2006 |

OTHER PUBLICATIONS

Patent Abstracts of Japan, Publication No. 07-114500, Published May 2, 1995.
Patent Abstracts of Japan, Publication No. 2008-108026, Published May 8, 2008.
Patent Abstracts of Japan, Publication No. 10-069420, Published Mar. 10, 1998.
Patent Abstracts of Japan, Publication No. 2005-284998, Published Oct. 13, 2005.
Patent Abstracts of Japan, Publication No. 2000-155655, Published Jun. 6, 2000.
Patent Abstracts of Japan, Publication No. 2003-256266, Published Sep. 10, 2003.
Japanese Patent Office Action issued in Japanese Patent Application No. 2010-523674 dated Mar. 12, 2013.

* cited by examiner

| TIME | ADDRESS (BLOCK) | SELECTOR SELECTION | CONTROLLER | |
|---|---|---|---|---|
| | | | READ | ERASE |
| 1 | ADDRESS b0 | #0 | #0 READ | |
| 2 | | #1 | #1 READ | #0 ERASE |
| 3 | | #0 | | #1 ERASE |
| 4 | ADDRESS b1 | #0 | #0 READ | |
| 5 | | #1 | #1 READ | #0 ERASE |
| 6 | | #0 | | #1 ERASE |
| ⋮ | | | | |
| | 501 | 502 | 503 | 504 | 505 |

FIG. 6

CONTROLLER FOR DISK ARRAY DEVICE, DATA TRANSFER DEVICE, AND METHOD OF POWER RECOVERY PROCESS

This application is a continuing application, filed under 35 U.S.C. §111(a), of International Application PCT/JP2008/064117, filed on Aug. 6, 2008.

FIELD

The embodiment discussed herein is related to a controller for a disk array device, a data transfer device, and a method of a power recovery process.

BACKGROUND

Conventionally, as a fault-tolerant storage device, a disk array device of a RAID (Redundant Arrays of Independent Disks or Redundant Arrays of Inexpensive Disks) configuration is known. The disk array device is connected to a host to form a RAID system. In general, in the RAID system, a write-back method is used when data is written in the disk device in response to an I/O request from the host. In the write-back method, upon receipt of the I/O request, requested data is not written in the disk device as a writing destination but is once stored in a cache memory, such as a volatile memory, and a completion response is sent to the host. After that, the data stored in the cache memory is caused to be reflected on the disk device as the writing destination. Therefore, when a power failure occurs, cache data in the cache memory is saved in a nonvolatile memory to prevent the cache data from being lost. Then, upon recovery from the power failure, the cache data saved in the nonvolatile memory is restored in the cache memory (see e.g. Japanese Laid-Open Patent Publication No. 2004-118837).

FIG. 12 illustrates a flow of a conventional power recovery process.

In the disk array device, a data transfer section 920 performs data transfer between a cache memory 910 and a nonvolatile memory 930 according to an instruction from a controller 900 that controls the entire disk array device. The data transfer section 920 includes a write circuit, not illustrated, a read circuit 921, and an erase circuit 922. When a power failure occurs, the write circuit performs a saving process for saving cache data from the cache memory 910 into the nonvolatile memory 930. The saving process requires a backup power supply. To this end, a plurality of write circuits are provided and parallel processing is executed. In the nonvolatile memory 930, a plurality of memory areas having different access ports are provided in a manner associated with the write circuits, respectively. In the illustrated example, there are provided a memory #0 (931) associated with a first access port, and a memory #1 (932) associated with a second access port. The read circuit 921 performs a read process for transferring cache data from the nonvolatile memory 930 to the cache memory 910. The erase circuit 922 performs an erase process for erasing the nonvolatile memory 930. Unless the nonvolatile memory 930 is erased once, it is impossible to write data therein. Therefore, in a cache data recovery process, the read process for transferring cache data saved in the nonvolatile memory 930 to the cache memory 910 and the erase process for erasing the nonvolatile memory 930 are both carried out. It should be noted that DMA (Direct Memory Access) is employed for the processing circuits of the data transfer section 920 due to necessity of performing a high-speed transfer process.

Next, the procedure of the cache data recovery process will be described.

When the disk array device recovers from the power failure, the controller 900 checks a flag to confirm whether or not the disk array device has recovered from the power failure (step S91). If the disk array device has recovered from the power failure, the controller 900 instructs the read circuit 921 to perform a cache recovery process for the memory #0 (931) (step S92). The read circuit 921 reads out the cache data saved in the memory #0 (931), and transfers the cache data to the cache memory 910. This data transfer processing is carried out sequentially from a start address of the memory #0 (931) in units of a predetermined data transfer size. At this time, whenever the data transfer of each unit is terminated, a read address block is set. Then, when the data transfer up to the last address block is completed, a completion notification (#0) is output to the controller 900. Upon receipt of the completion notification (#0), the controller 900 instructs the read circuit 921 to execute a cache recovery process for the memory #1 (932) (step S93). The same process as described above is performed to transfer cache data of the memory #1 (932) to the cache memory 910. When the cache recovery process has been terminated, a completion notification (#1) is delivered to the controller 900. Upon receipt of the completion notification (#1), the controller 900 starts a host I/O request process by write through (step S94). Then, the controller 900 executes a restoration process for writing the cache data in a disk device 940 (step S95). By executing processing thus far, cache data before the power failure is recovered in the cache memory 910.

Subsequently, the erase process is carried out. The controller 900 instructs execution of the erase process for the memory #0 (931) (step S96). In response to this instruction, the erase circuit 922 starts the erase process for the memory #0 (931). After that, the controller 900 instructs execution of the erase process for the memory #1 (932) (step S97). In the erase process as well, it is necessary to set a new address block for each unit of data. After completion of the erase process for all the areas, the erase circuit 922 outputs a completion notification.

After receiving the completion notification of the erase process, the controller 900 starts a host I/O request process by write back (step S98). Then, the controller 900 starts the disk array device (step S99).

In the RAID system, however, it takes long time to complete the conventional cache recovery process, and hence the start-up of the disk array device is delayed after the recovery of power.

As illustrated in FIG. 12, in the power recovery process, also after the cache data is restored in the cache memory 910, unless the erasing of the nonvolatile memory 930 is terminated, the disk array device cannot be started. As a consequence, it takes extra time for the erase process, whereby time necessary for the recovery process becomes very long. For example, if the number of DMA engines of the data transfer section 920 is increased, the speed of the recovery process can be increased. However, this method is not practicable since hardware resources are limited. Further, the controller 900 has to give instructions to the read circuit 921 and the erase circuit 922, which increases load on the recovery process. This also hinders reduction of time for recovery process.

Further, although not illustrated, in the data transfer section 920, to enable detection of errors generated during transfer of data and recovery of data, a redundant code is added to the data every predetermined data length. In the read circuit 921, the redundant code is used for detection and correction of errors. Therefore, the data transfer size is limited to the size of a data length to which the redundant code is added. By increasing the prefetch amount, it is possible to increase the speed of the data transfer processing, but this makes it impossible to correct errors. Therefore, it has been difficult to reduce time for cache data recovery by increasing the prefetch amount.

As described hereinabove, it has been difficult to reduce time necessary for the cache data recovery process performed during recovery from a power failure. This problem has been a major factor causing an increase in the rise time of the disk array device after power recovery.

SUMMARY

According to an aspect of the invention, there is provided a controller for a disk array device, for recovering data stored in a cache memory, upon recovery from a power failure, comprising a nonvolatile memory configured to include a plurality of access ports, and have cache data written and stored therein which is stored in the cache memory at a time of occurrence of the power failure, and a data transfer section which comprises a reading unit configured to read the cache data stored in the nonvolatile memory in units of a predetermined data transfer size and write the cache data back in the cache memory, an erasing unit configured to erase data stored in the nonvolatile memory, and a control unit configured to be operable when recovery from the power failure is detected, to perform a power recovery process in which the control unit specifies different ones of the access ports for the reading unit and the erasing unit, respectively, thereby causing the reading unit and the erasing unit to operate in parallel, and sets the predetermined data transfer size as appropriate according to a state of occurrence of an error during data transfer by the reading unit, such that the cache data is restored in the cache memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates the relationship between selector selection and a controller.

DESCRIPTION OF EMBODIMENTS

Figure 1:
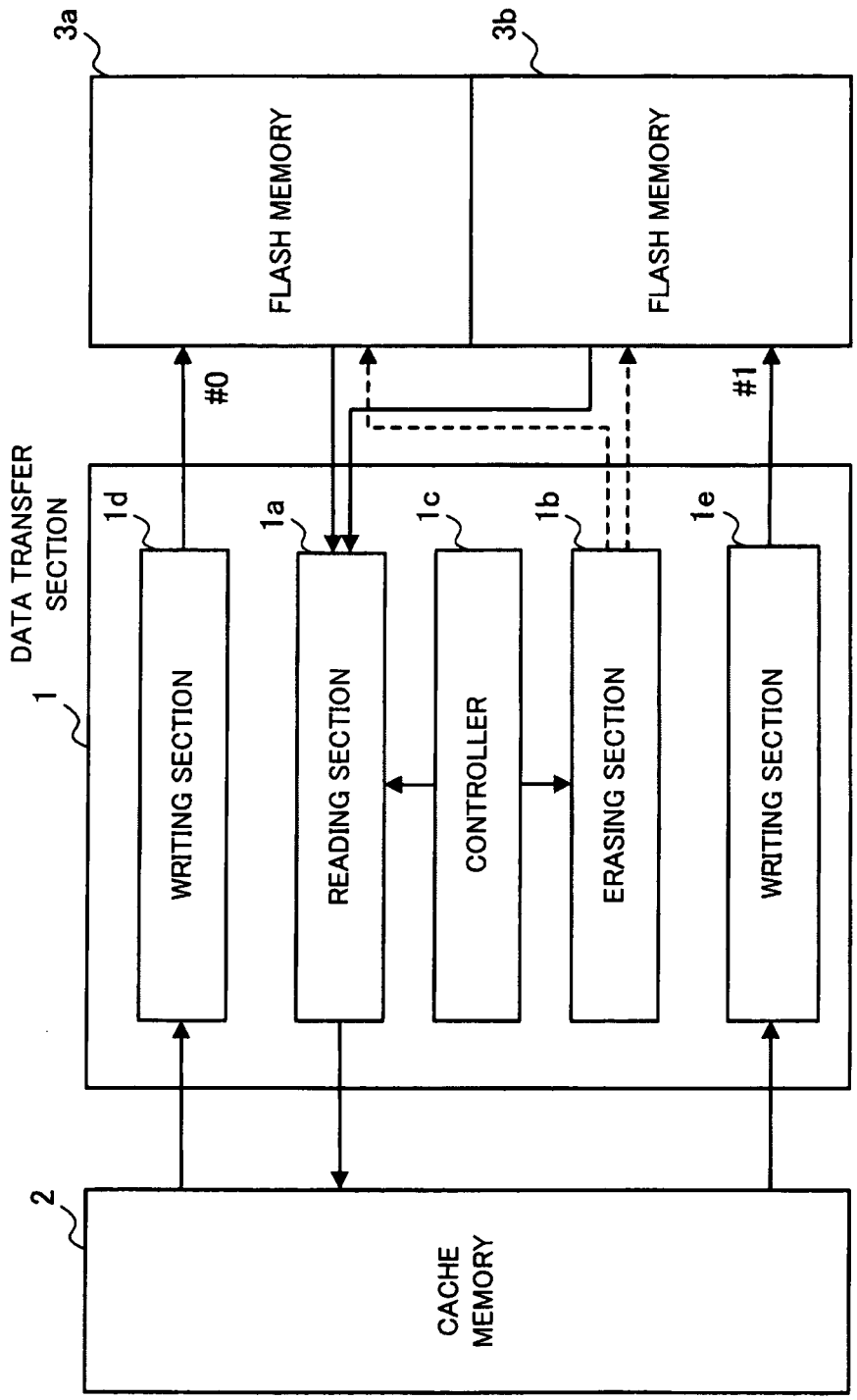
FIG. 1 schematically illustrates the present invention.

Embodiments of the present invention will be explained below with reference to the accompanying drawings, wherein like reference numerals refer to like elements throughout.

First, a description will be given of an outline of the present invention, and then a description will be given of the embodiment.

FIG. 1 schematically illustrates the present embodiment.

The controller of a disk array device includes a data transfer section 1, a cache memory 2, and flash memories 3a and 3b. Further, the controller includes a plurality of disk devices, not illustrated, and a CPU (Central Processing Unit) that controls the entire disk array device, and manages data stored in a distributed manner across the disk devices.

The cache memory 2 is a storage section in which data for the disk devices is temporarily stored, and the stored data is erased during interruption of power supply.

The flash memories 3a and 3b are nonvolatile memories. Before occurrence of a power failure, cache data in the cache memory 2 is copied and stored in the flash memories 3a and 3b via the data transfer section 1. The access to the flash memories 3a and 3b is performed by specifying access ports and address blocks thereof. The flash memories 3a and 3b include a plurality of access ports, i.e. two access ports #0 and #1 in the illustrated example. The access ports #0 and #1 are associated with writing sections 1d and 1e, respectively. Now, let it be assumed that the flash memory 3a is accessed via the access port #0, and the flash memory 3b is accessed via the access port #1, for convenience sake. Further, the flash memories 3a and 3b need to be erased once before data is written therein.

The data transfer section 1 includes a reading section 1a, an erasing section 1b, a controller 1c, and the writing sections 1d and 1e, and carries out a cache data saving process when a power failure has occurred, and a cache data recovery process upon recovery from the power failure.

The reading section 1a accesses the flash memories 3a and 3b via specified access ports according to a read instruction from the controller 1c, and reads out cache data of a specified data transfer size from the flash memories 3a and 3b. Then, the reading section 1a writes the read-out cache data in the cache memory 2. The specified data transfer size is a prefetch amount. The cache data is read out according to a selected one of a first data transfer mode in which data is transferred with a small prefetch amount and a second data transfer mode in which data is transferred with a large prefetch amount. The first data transfer mode uses a prefetch amount adapted to the range of a redundant code added to cache data, and can identify the location of an error and correct the error. The first data transfer mode is referred to as the "correct mode" or the "single mode". The second data transfer mode uses a prefetch amount made larger than that of the single mode, and thereby enables high-speed data transfer. Although the second data transfer mode detects an error, it does not identify the location of an error or correct the error. The second data transfer mode is referred to as the "fast mode" or the "burst read". The controller 1c determines which mode is to be selected, and issues a read instruction according to the determination.

The erasing section 1b accesses the flash memories 3a and 3b via the respective specified access ports according to an erase instruction from the controller 1c, thereby erasing data therefrom.

When recovery from a power failure is detected, the controller 1c specifies different access ports for the reading section 1a and the erasing section 1b, and causes the reading section 1a and the erasing section 1b to operate in parallel with each other. At this time, an area where reading by the reading section 1a has been terminated is assigned to the erasing section 1b. By thus causing a time period necessary for a read process and a time period necessary for an erase process to overlap each other, it is possible to reduce time necessary for the cache data recovery process. Further, at the start of the cache data recovery process, the speed of data transfer is increased by selecting the fast mode in which data is transferred with a large prefetch amount as a data transfer mode. When an error has been detected during data transfer, the fast mode is switched to the correct mode to thereby cause data to be transferred to an area where the error has been detected, again. This makes it possible to perform high-speed data transfer in the fast mode when the data transfer is normal, whereas when an error has occurred, it is possible to transfer data while correcting the error in the correct mode.

When a power failure has been detected, the writing sections 1d and 1e perform a saving process for copying data stored in the cache memory 2 and writing the data in the flash memories 3a and 3b. The writing section 1d transfers data to the flash memory 3a, and the writing section 1e transfers data to the flash memory 3b. At this time, the writing sections 1d and 1e calculate a redundant code for every predetermined data area, and save the redundant. code together with cache data. These processes are carried out in parallel by the writing sections 1d and 1e, to thereby increase the speed of the saving process.

Next, a description will be given of the operation of the controller of the disk array device configured as above. Out of data stored in the disk devices, data frequently referred to are copied on the cache memory 2, and when an I/O request is made by a host, the data on the cache memory 2 is read and written instead of the data in the disk devices. When a power failure has occurred, the writing sections 1d and 1e transfer cache data stored in the cache memory 2 to the flash memories 3a and 3b, respectively. At this time, the redundant code is calculated, and is stored together with the cache data. Thus, when a power failure has occurred, the cache data are saved in the flash memories 3a and 3b.

Upon recovery from the power failure, a request for restoration of the cache data is input to the controller 1c. The controller 1c instructs the reading section 1a to read the cache data in the fast mode, selects an associated one of the access ports, and instructs the reading section 1a to start reading the cache data via the selected access port. For example, the controller 1c causes the cache data stored in the flash memory 3a to be transferred via access port #0 to the cache memory 2 in a data transfer size defined in the fast mode. Hereinafter, a unit of data transferred in the fast mode will be referred to as a fast mode block. When an error has been detected during the transfer of the cache data, the controller 1c switches the data transfer mode to the correct mode, and causes the data transfer to be performed again from the start of a fast mode block where the error has been detected. When a predetermined condition of e.g. normal termination of data transfer of the whole area where the error has been detected is satisfied, the controller 1c switches the data transfer mode to the fast mode again. Thus, upon termination of the transfer of one fast mode block or termination of data transfer from the flash memory 3a, the controller 1c switches the access port to the other to perform data transfer from the flash memory 3b. At this time, the controller 1c specifies the access port via which the data transfer has already been completed, and gives an erase instruction to the erasing section 1b via the access port. This causes the reading section 1a and the erasing section 1b to operate in parallel with each other. For example, when the reading section 1a is transferring the cache data from the flash memory 3b to the cache memory 2 via the access port #1, the erasing section 1b erases the flash memory 3a via the access port #0. It should be note that when a data transfer error occurs during the read process, the data transfer mode is switched in the same manner as described above to cause execution of a process for retransferring cache data. Thus, when cache data in a predetermined area of the flash memory 3b has been restored in the cache memory 2 via the access port #1, the same area of the flash memory 3a via the access port #0 has been erased. Then, the controller 1c instructs the erasing section 1b to perform the erase process for the same area of the flash memory 3b which has not been erased.

When the access ports are switched in units of fast mode blocks for sequential processing, the above-described procedure is repeatedly carried out. More specifically, the reading section 1a is set to the access port #0, and is caused to perform the read process on the next fast mode block. After termination of the read process, the access port #1 and the access port #0 are switched to the reading section 1a and the erasing section 1b, respectively, to cause the reading section 1a and the erasing section 1b to operate in parallel with each other. After completion of the operations of the reading section 1a and the erasing section 1b, the access port #1 is switched to the erasing section 1b to cause the erasing section 1b to perform the erase process. Such a procedure is repeatedly performed in units of fast mode blocks. When it is possible to specify different addresses to the reading section 1a and the erasing section 1b to cause the reading section 1a and the erasing section 1b to operate, the reading section 1a and the erasing section 1b may be configured to process respective different fast mode blocks. More specifically, while the erasing section 1b is set to the access port #1, and is caused to perform the erase process, the reading section 1a is set to the access port #0, and is caused to perform the read process on the next fast mode block unit.

After the above processing procedure is carried out to restore the cache data stored in the flash memories 3a and 3b in the cache memory 2, the disk array device is started.

As described above, by causing the reading section 1a and the erasing section 1b to operate in parallel, it is possible to reduce time necessary for restoring the cache data in the cache memory 2. Further, it is possible to shorten time necessary for the recovery also by increasing the speed of a throughput by increasing the prefetch amount during reading of the cache data. This makes it possible to shorten the rise time of the disk array device.

In the illustrated example, it is assumed that the parallel operations of the reading section 1a and the erasing section 1b and the control of the prefetch amount during reading the cache data are both executed. This provides a lot of advantageous effects. However, by executing either the parallel operations or the control of the prefetch amount, it is also possible to shorten time necessary for restoring the cache data in the cache memory 2 to thereby shorten time necessary for starting the disk array device.

Next, the present embodiment will be described in detail with reference to drawings by taking as an example a case where the present embodiment is applied to a RAID system.

Figure 2:
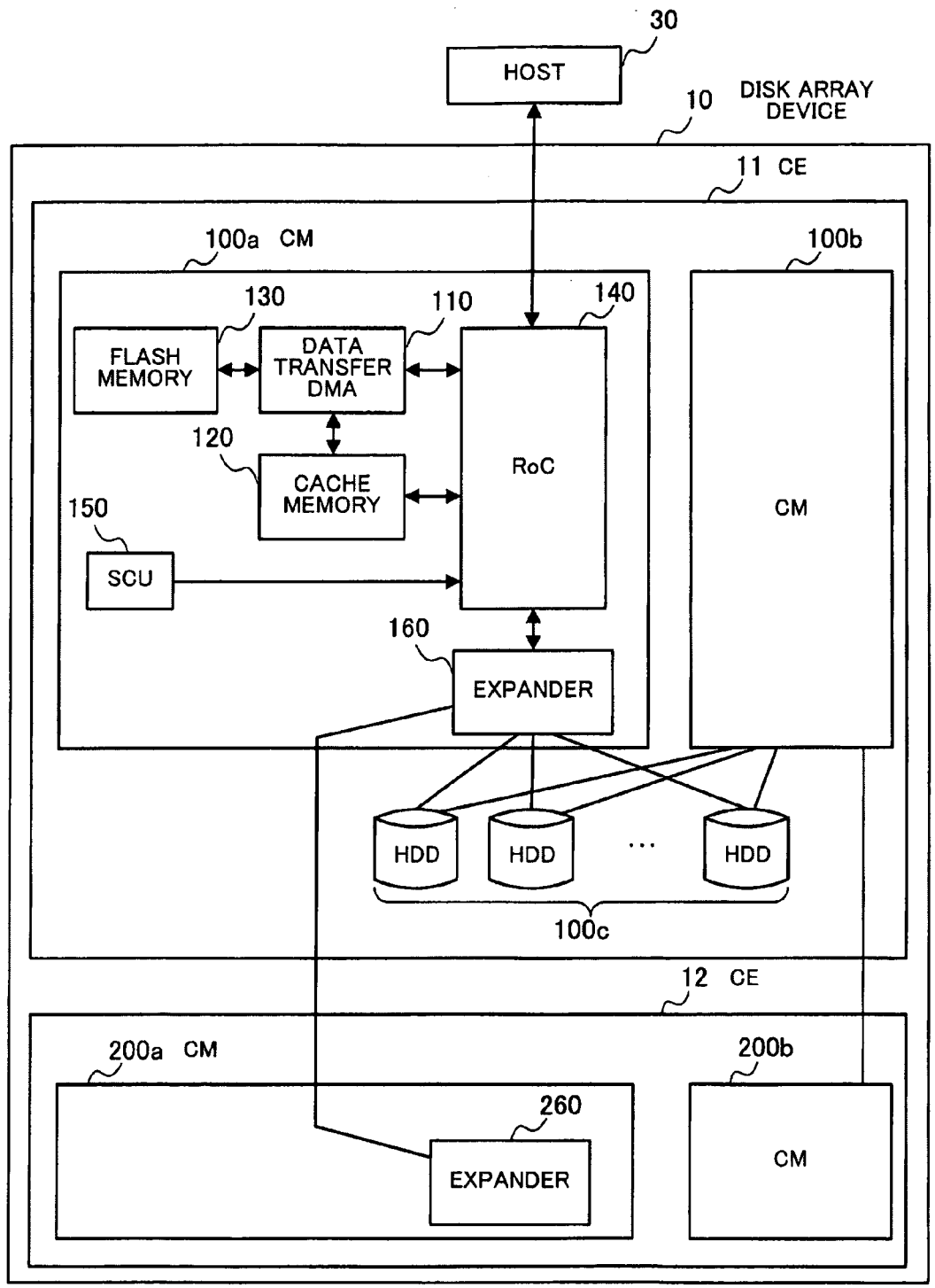
FIG. 2 illustrates an example of a RAID system.

FIG. 2 illustrates an example of the configuration of the RAID system.

The RAID system according to the present embodiment includes a host 30, and a disk array device 10, and is configured such that data is read and written in the disk array device 10 according to an I/O request from the host 30. In this disk array device 10, controller enclosures (CE) 11 and 12, each of which stores and manages data in a manner distributed across a plurality of disk devices, are connected via a network. It is possible to extend the construction of the disk array device 10 such that another controller enclosure is connected thereto, on an as-needed basis.

The controller enclosure 11 includes controller modules (CM) 100a and 100b for performing cache management, disk control, and so forth, and a disk device group 100c. The controller modules 100a and 100b have a redundant configuration in which each of the controller modules 100a and 100b is connected to the disk device group 100c. Further, similarly to the controller enclosure 11, the controller enclosure 12 as well includes controller modules 200a and 200b, and a disk device group, not illustrated. Further, The controller enclosures 11 and 12 have a redundant configuration in which the controller modules of one of them are connected to the controller modules of the other, respectively. Further, the controller modules 100a and 200a are connected via an expander 160 and an expander 260. Similarly, the controller modules 100b and 200b as well are connected via the expander 160 and the expander 260.

Here, a description will be given of the controller modules by taking the controller module 100a as an example. The controller module 100a includes a data transfer DMA 110, a cache memory 120, a flash memory 130, a RoC (RAID on Chip) 140, a super capacitor unit (SCU) 150, and the expander 160.

The data transfer DMA 110 is a data transfer circuit that controls data transfer between the cache memory 120 and the flash memory 130, according to an instruction from the RoC 140. The cache memory 120 temporarily stores part of data to be stored in the disk device group 100c according to an instruction from the RoC 140. The flash memory 130 is a nonvolatile memory. The RoC 140 is a processor that performs cache management and host interface control. More specifically, the RoC 140 processes an I/O request from the host 30, and controls a cache data saving process performed when a power failure has occurred, and the cache data recovery process performed upon recovery from the power failure. The super capacitor unit 150 is a large-capacity capacitor for supplying electric power to the RoC 140 when a power failure has occurred. The expander 160 is a processor for the disk control.

The other controller modules 100b, 200a and 200b have the same configuration as that of the controller module 100a.

In the RAID system configured as above, when the I/O request is input from the host 30 to the controller module 100a, if requested data is stored in the cache memory 120, the RoC 140 reads out the requested data from the cache memory 120 and responds to the host 30. Also when a write request is issued from the host 30, the RoC 140 writes data in a corresponding area of the cache memory 120 and responds to the host 30. Further, write-back processing of cache data is performed at a predetermined repetition period. If the requested data is not stored in the cache memory 120, the RoC 140 reads corresponding data from the disk device group 100c and responds to the host 30. Further, at this time, the read-out data is stored in the cache memory 120. As described above, cache data corresponding to the data not updated in the disk device group 100c also exists in the cache memory 120 until termination of the write-back processing.

When a power failure has occurred in the above-described state, data stored in the cache memory 120 all disappears. To solve this problem, when occurrence of a power failure has been detected, the RoC 140 starts the data transfer DMA 110 to perform the data saving process in which cache data stored in the cache memory 120 are stored in the flash memory 130. Then, upon recovery from the power failure, the RoC 140 starts the data transfer DMA 110 to perform the cache data recovery process in which the cache data saved in the flash memory 130 is restored in the cache memory 120.

Figure 3:
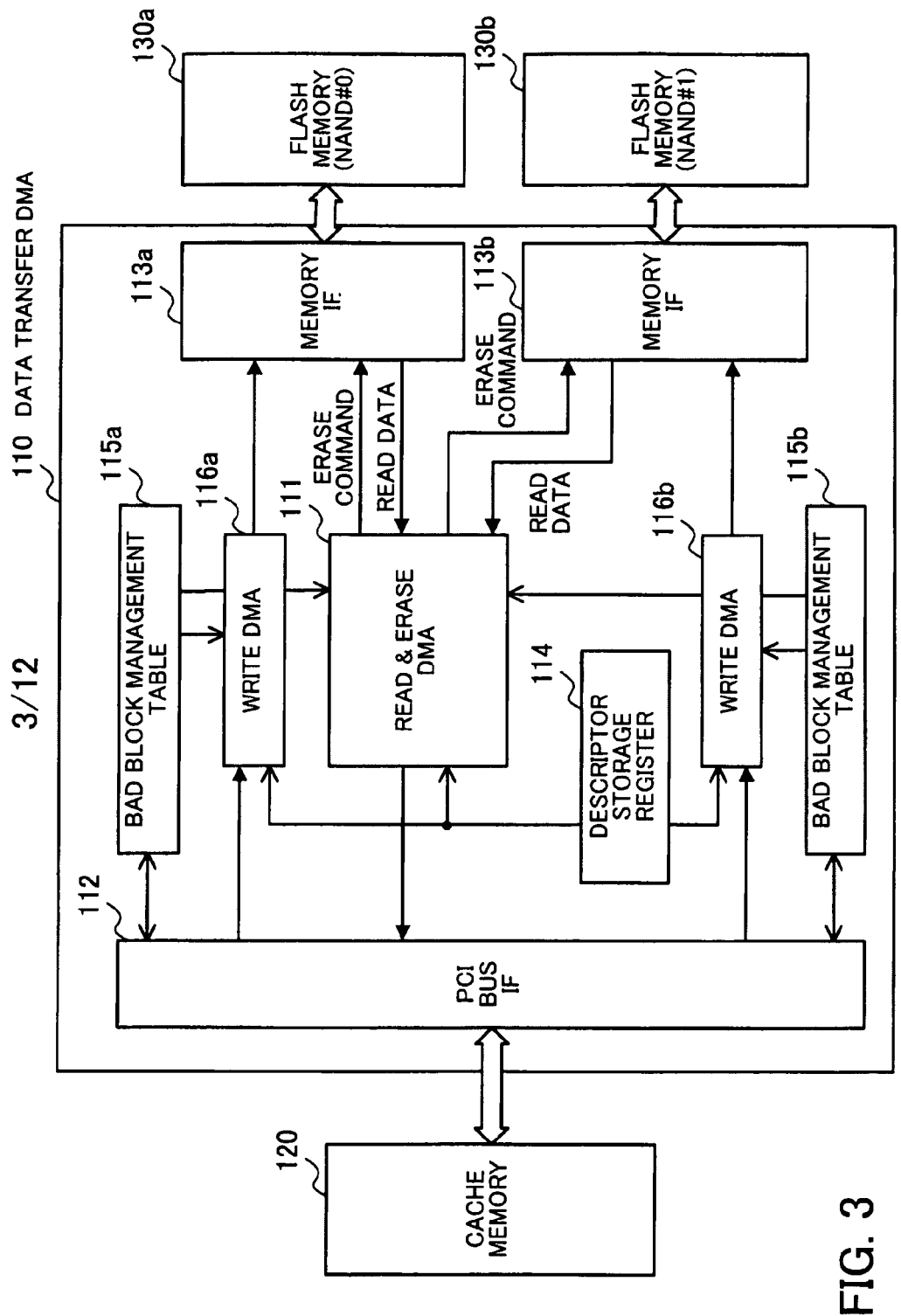
FIG. 3 is a block diagram of a data transmission DMA.

Next, the configuration of the data transfer DMA 110 will be described in detail together with the cache memory 120 and the flash memory 130. FIG. 3 is a block diagram of the data transfer DMA.

The data transfer DMA 110 includes a read & erase DMA 111 for performing the read process and the erase process, a PCI (Peripheral Components Interconnect) bus interface (hereinafter referred to as the "interface") 112, memory interfaces 113a and 113b, a descriptor storage register 114, bad block management tables 115a and 115b, and write DMAs 116a and 116b. The data transfer DMA 110 is connected to the cache memory 120 via the PCI bus interface 112. Further, the data transfer DMA 110 is connected to a flash memory 130a via the memory interface 113a, and is connected to a flash memory 130b via the memory interface 113b.

Here, to reduce time necessary for data access from the host 30, out of data to be stored in the disk device group 100c, data with higher access frequency is temporarily stored in the cache memory 120. Normally, as the cache memory 120, there is used a memory that is capable of accessing at a speed equivalent to the processing speed of the processor, i.e. a volatile memory, such as a DRAM (Dynamic Random Access Memory) or a SRAM (Static RAM).

The flash memories 130a and 130b are memories for storing data in the cache memory 120, which is lost if electric supply is interrupted, during interruption of power supply. Examples of the flash memories 130a and 130b include a NAND (Not AND) type flash memory, a NOR type flash memory, and so forth. The NAND type is configured to be accessible in units of blocks of data, and the NOR type is configured to be accessible in units of bits of data. In the following description, it is assumed that the flash memories 130a and 130b are of the NAND type in which data transfer is performed in units of blocks of data, and the flash memory 130a is also referred to as the "NAND #0" while the flash memory 130b is also referred to as the "NAND #1". Further, in the NAND type flash memory, there sometimes occur phenomena, such as a write failure and an erasing failure caused by degradation of the NAND type flash memory, and a phenomenon that data is made unreadable due to degradation of the NAND type flash memory after the data has been written therein. For the RAID system for which data protection is a critical requirement, it is preferable to provide a section for recovering data having been made unreadable. To this end, the RAID system is configured to be capable of adding a redundant bit to data of a predetermined data length such that the data can be detected and corrected during reading the same. For example, an XOR parity, a CRC (Cyclical Redundancy Check), an AID (Area ID), and so forth are used. Further, in recent years, a hybrid NAND device is also commercially available which is formed by integrating the SRAM+control logic and the NAND made into one chip. Examples of the hybrid NAND device include OneNAND available from Samsung Electronics. It should be noted that "writing data" in the flash memories 130a and 130b means "removing an electric charge" from a cell (1→0), and "erasing data" from the flash memories 130a and 130b means "injecting an electric charge into" a cell (0/1→1). Therefore, it is necessary to perform erase prior to write. Further, in the present embodiment, it is assumed that common addresses are set to the flash memory (NAND #0) 130a and the flash memory (NAND #1) 130b. More specifically, addresses specifying respective memory locations of the flash memory (NAND #0) 130*a* and addresses specifying respective memory locations of the flash memory (NAND #1) 130*b* are the same.

Next, a description will be given of each component of the data transfer DMA 110.

The read & erase DMA 111 issues a read command and an erase command to the memory interfaces 113*a* and 113*b* according to instructions from the RoC 140, not illustrated, upon recovery power from a power failure. For the read process for returning cache data from the flash memories 130*a* and 130*b* to the cache memory 120, when an error has occurred, it is necessary to increase hardware resources so as to perform restoration (regeneration) of data. Due to such constraints on the hardware, normally, the read process is performed only by one system. That is, the flash memory 130*a* and the flash memory 130*b* are selected in the mentioned order, and are subjected to the read process one by one. The erase command is capable of erasing areas of the flash memory 130*a* and the flash memory 130*b* in units of blocks of data via the memory interfaces 113*a* and 113*b* to which the erase command have been issued. At this time, the erase command and the read command can be issued to different access ports which are associated with the memory interfaces 113*a* and 113*b*, respectively. Thus, the read process is executed for one of the flash memories 130*a* and 130*b*, and the erase process is executed for the other. Further, the read process includes the fast mode in which data is transferred with a larger prefetch amount and the correct mode in which data is transferred with a smaller prefetch amount, and one of the modes can be selected for execution.

The PCI bus interface 112 controls data transfer between the read & erase DMA 111, the write DMAs 116*a* and 116*b*, and the cache memory 120. More specifically, the PCI bus interface 112 performs arbitration between the read & erase DMA 111 and the write DMAs 116*a* and 116*b*, and interrupt control.

The memory interfaces 113*a* and 113*b* control data transfer between the read & erase DMA 111, the write DMAs 116*a* and 116*b*, and the flash memories 130*a* and 130*b*. More specifically, the memory interface 113*a* controls data transfer between the DMAs 111 and 116*a*, and the flash memory 130*a*, and the memory interface 113*b* controls data transfer between the DMAs 1111 and 116*b*, and the flash memory 130*b*.

The descriptor storage register 114 stores descriptor information used by the DMAs.

The bad block management table 115*a* manages bad blocks of the flash memory 130*a* in each of which an error was detected, and the bad block management table 115*b* manages bad blocks of the flash memory 130*b* in each of which an error was detected.

The write DMAs 116*a* and 116*b* save cache data stored in the cache memory 120 in the flash memories 130*a* and 130*b* when a power failure has occurred, in response to an instruction from the RoC 140. In power failure handling, it is necessary to write the cache data stored in the cache memory 120 in the flash memories 130*a* and 130*b* within a time period over which the super capacitor SCU 150 can supply electric power to the RoC 140. Therefore, to increase the speed of the write process, two systems of the write DMA 116*a* and the write DMA 116*b* are provided. The write DMA 116*a* is connected to the flash memory 130*a* via the memory interface 113*a*, and the write DMA 116*b* is connected to the flash memory 130*b* via the memory interface 113*b*. During the data saving process, the write DMAs 116*a* and 116*b* operate at the same time, and write cache data and redundant codes added to the cache data in the associated flash memories 130*a* and 130*b*, respectively.

Figure 4:
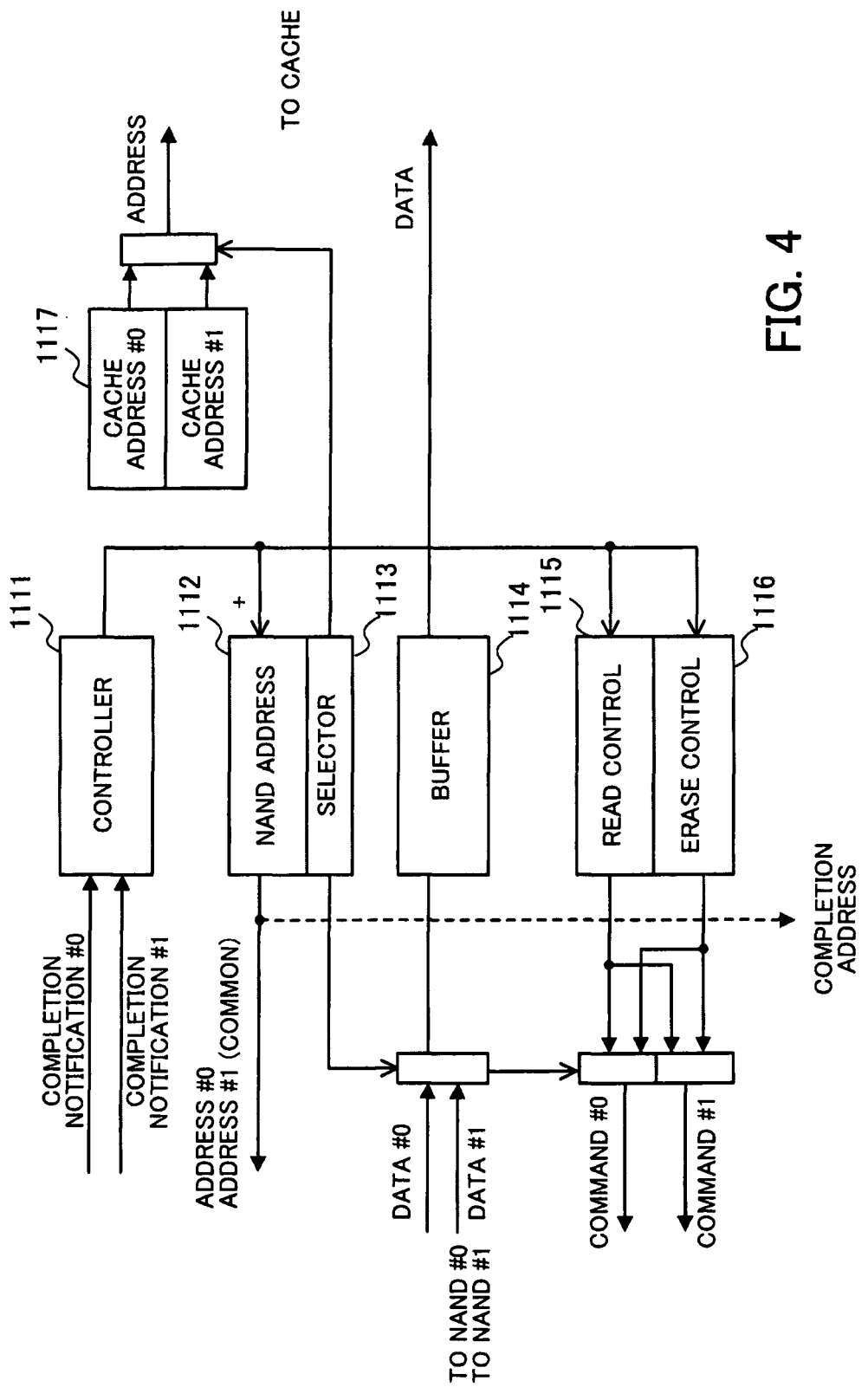
FIG. 4 is a block diagram of an example of a read & erase DMA.

Next, a detailed description will be given of the read & erase DMA 111. FIG. 4 is a block diagram of an example of the read & erase DMA.

The read & erase DMA 111 includes a controller 1111, a NAND address (register) 1112, a selector 1113, a buffer 1114, a read control 1115, an erase control 1116, and a cache address (register) 1117.

The controller 1111 controls the overall operation' of the read & erase DMA 111. Upon receipt of a completion notification #0 from the NAND #0 (flash memory 130*a*), and a completion notification #1 from the NAND #1 (flash memory 130*b*), the controller 1111 instructs the read control 1115 and the erase control 1116 to perform the next operation. Further, the controller 1111 sets the NAND address 1112 to the start address of an address block indicative of a NAND area which is to be processed next, and gives an instruction. If the read process is to be performed, first, the controller 1111 selects the fast mode and instructs the read control 1115 to operate in the fast mode. When an error has occurred in the middle of the operation in the fast mode, the controller 1111 switches the transfer mode from the fast mode to the correct mode, and transfers data from the start of a fast mode block where the error has been detected, again. When an error is detected in the middle of the data transfer, the controller 1111 corrects the error, and restores the data. When the data transfer of the fast mode block where the error has been detected is normally terminated, the controller 1111 switches the transfer mode back to the fast mode. The switching between the fast mode and the correct mode will be described in detail hereinafter.

The NAND address 1112 stores an address #0 for the NAND #0 and an address #1 for the NAND #1, which are start addresses of address blocks indicative of memory areas which are to be processed next. The NAND #0 and the NAND #1 start processing, such as data transfer, using the addresses set in the NAND address 1112. In the present embodiment, the addresses of the NAND #0 and the addresses of the NAND #1 are common. By making the address #0 and the address #1 common, it is possible to make the chip size smaller. Further, a setting of the NAND address 1112 is sent from the NAND #0 and the NAND #1 to the write DMAs 116*a* and 116*b* as a transfer completion notification. In the read process, it is assumed that data in the NAND from the start address to the end address thereof is sequentially read and written back in the cache memory 120.

The selector 1113 selects combination between data input from the NAND and the cache address 1117, and switches a command output destination. For example, in the read process, when data is to be read from the NAND #0, the selector 1113 selects read signal data #0 from the NAND #0, and selects a cache address #0 for the cache memory side. At the same time, the read control 1115 for controlling the read process is connected to a command #0 such that a command is output to the NAND #0. When data is to be read from the NAND #1, the selector 1113 selects read signal data #1 from the NAND #1, and selects a cache address #1 for the cache memory side. The read control 1115 is connected to the command #1. Further, the erase control 1116 for controlling the erase process is connected oppositely to the read control 1115. That is, when the read control 1115 is connected to the address port #0 (on the side of the command #0), the erase control 1116 is connected to the address port #1 (on the side of the command #1).

The buffer 1114 temporarily stores the data #0 read from the NAND #0 or the data #1 read from the NAND #1. When the data is accumulated to a predetermined size, the data is transferred to the cache memory 120.

The read control 1115 controls the reading of data from a specified area according to the controller 1111. At this time, the read control 1115 performs the read process in a designated mode (the fast mode or the correct mode). If the fast mode is designated, the read control 1115 performs high-speed data transfer of the larger prefetch amount. During the data transfer, an error is only detected. If the correct mode is designated, the read control 1115 performs data transfer of the smaller prefetch amount. When an error is detected, the read control 1115 identifies a location of an error where the error has occurred, and corrects the error.

The erase control 1116 controls the erase process according to the controller 1111. The erase control 1116 delivers a command for causing the erase process to be performed, to the NAND #0 or the NAND #1, specified by the controller 1111.

The start address of an address block indicative of an area in the cache memory 120, which is a transfer destination of cache data output from the buffer 1114, is set in the cache address 1117.

The read & erase DMA 111 configured as above realizes the processing functions of the present embodiment.

Now, a description will be given of the fast mode and the correct mode. In the NAND device, there can occur phenomena, such as a write failure and an erase failure, caused by degradation of the NAND device, and a phenomenon that data is made unreadable due to degradation of the NAND device after the data has been written therein. To solve these problems, when data is to be transferred, a redundant code is added to each data item of a predetermined data length, and then the data item and the redundant code added thereto are transferred. In the correct mode, data transfer is performed in a transfer size which is maximized by the predetermined data length and the redundant code added thereto. The data is restored using the added redundant code. In contrast, in the fast mode, since the prefetch amount is made larger than the data length of data, the redundant code is not used. Therefore, even if an error is detected during transfer of the data, the data is not restored.

Figure 5:
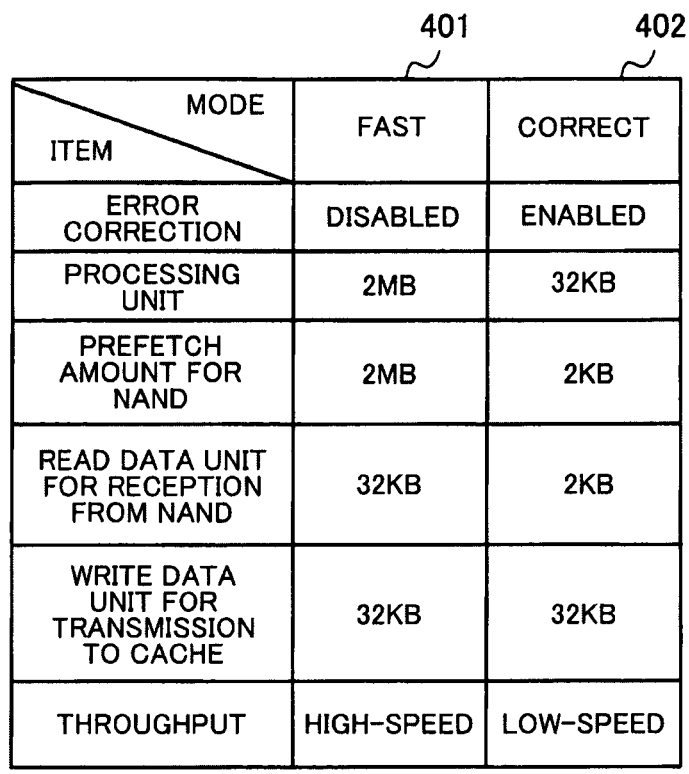
FIG. 5 is a table of features of a fast mode and a correct mode.

FIG. 5 illustrates the features of the fast mode and the correct mode. In the illustrated example, it is assumed that the minimum unit of transfer data to the NAND is set to "2 kilobytes (hereinafter referred to as "2 KB")", a redundant code is calculated every 2 KB, and during data transfer, the redundant code is stored in a spare area prepared in advance together with a data writing area used for data transfer.

The fast mode (burst read), denoted by reference numeral 401, is for performing high-speed data transfer, in which the prefetch amount is made larger than the unit according to which the redundant code is calculated. Here, it is assumed that the unit of transfer data is set to "2 megabytes (hereinafter referred to as "2 MB")", and the prefetch amount used for data transfer to the NAND device is also set to 2 MB. This causes a transfer completion notification to be generated every 2 MB. If an error, such as timeout, is detected during data transfer, the error is left e.g. as status information. However, the redundant code generated every 2 MB is not left behind. Therefore, although an error can be detected when the transfer completion notification is transmitted, it is "impossible" to correct the error. Further, the read data unit of read data for reception from the NAND device is set to "32 KB" in accordance the write data unit of "32 KB" of write data for transmission to the cache. This makes the speed of the throughput "high".

The correct mode (single mode), denoted by reference numeral 402, in which data is transferred with the smaller prefetch amount, is capable of correcting an error. More specifically, the unit according to which a redundant code is generated is set to the maximum prefetch amount. Here, the prefetch amount used for transfer of data to the NAND device is also set to "2 KB", and the read data unit for reception is also set to "2 KB". This makes it possible to generate the transfer completion notification every 2 KB, thereby making it possible to restore data using the redundant code when an error has occurred. However, the amount of data transferred at one time is small. Further, the write data unit for transmission to the cache is set to "32 KB". This makes the speed of the throughput "low".

Next, a description will be given of the relationship between the selection of the selector 1113, the read control 1115, and the erase control 1116.

FIG. 6 illustrates the relationship between the selection of the selector and the controller.

In the present embodiment, it is assumed that the read process and the erase process are executed for the flash memory (NAND #0) 130*a* and the flash memory (NAND #1) 130*b* in units of fast mode blocks, which are the processing units of the fast mode.

A time column 501 indicates elapsed times which elapse in the order of 1, 2, 3, 4, 5, and 6.

These values do not represent elapsed times themselves but only indicate the before-and-after relationship in time.

An address block column 502 indicates an address block of the NAND address of a fast mode block unit, for selection. It is assumed that the read process for the NAND #0 or the NAND #1 is sequentially executed from the start address thereof, and hence an address block b0 indicates an address block of each of first fast mode blocks of the NAND #0 and the NAND #1. Similarly, an address block b1 indicates an address block of each of the next fast mode blocks of them.

A selector selection column 503 indicates selections of the selector on the side of the read control 1115. A selector selection #0 indicates that the NAND #0 is selected for the read control 1115, and a selector selection #1 indicates that the NAND #1 is selected for the read control 1115. When the selector selection #0 is selected for the read control 1115, the selector selection #1 is selected for the erase control 1116. As described above, the selector 1113 always selects ports different from each other for the read control 1115 and the erase control 1116.

A controller column indicates commands issued by the read control 1115 and the erase control 1116. A read column 504 indicates output commands issued by the read control 1115, and an erase column 505 indicates output commands issued by the erase control 1116.

Hereinafter, a description will be given of the operations illustrated in FIG. 6.

At time "1", the controller 1111 performs settings for transferring cache data of the first fast mode block of the NAND #0. The selector 1113 connects the data #0 of the NAND #0 to the buffer 1114 and selects the cache address #0. The start address of the address block b0 is set in the NAND address 1112. Further, the read control 1115 is connected to the command #0. At this time, the command #1 is selected for the erase control 1116. In this state, the read control 1115 is started, and the read command in the fast mode is issued to the NAND #0. The NAND #0 reads data from the address block b0 in units of 32 KB, and transfers the data to the buffer 1114. If no error is detected, data in the buffer 1114 is transferred to the cache. Thus, the cache data of the first fast mode block of the NAND #0 is transferred to the cache.

At time "2", the controller 1111 performs settings for transferring cache data of the first fast mode block of the NAND

1. The selector 1113 connects the data #1 of the NAND #1 to the buffer 1114 and selects the cache address #1. In the NAND address 1112, the start address of the address block b0 remains as it is. Further, the read control 1115 is connected to the command #1. At this time, the command #0 is selected for the erase control 1116. In this state, the read control 1115 is started, and the read command in the fast mode is issued to the NAND #1. The NAND #1 reads data from the address block b0 in units of 32 KB, and transfers the data to the buffer 1114. If no error is detected, data in the buffer 1114 is transferred to the cache. Further, during this time, the erase control 1116 is also started. The erase control 1116 performs the erase process for the address block b0 (the first fast mode block) of the NAND #0. Thus, the cache data of the first fast mode block of the NAND #1 is transferred to the cache, and at the same time the first fast mode block of the NAND #0 is erased.

At time "3", the controller 1111 performs settings for erasing the first fast mode block of the NAND #1. The selector 1113 selects the cache address #0 for the read control 1115. This causes the erase control 1116 to be connected to the command #1. In the NAND address 1112, the start address of the address block b0 remains as it is. When the erase control 1116 is started, the erase control 1116 performs the erase process for the address block b0 (the first fast mode block) of the NAND #1.

By executing the above-described processing procedure, the cache data of the first fast mode blocks of the NAND #0 and the NAND #1 are transferred to the cache, and the erase process on these areas of the NAND #0 and the NAND #1 is completed. Up to this stage, the process is carried out without changing the address block (start address thereof) set in the NAND address 1112 but simply by switching access ports by the selector 1113. As described above, by making the addresses of the NAND #0 and the addresses of the NAND #1 common, there is no need to provide two address storage circuits for the read process and the erase process, which prevents an increase in the scale of the circuit.

When the processing of the first fast mode blocks of the NAND #0 and the NAND #1 is terminated, an address block b1 for instructing the NAND address 1112 to process the next fast mode blocks is set. Then, at times "4", "5", and "6", the same processing as executed at times "1", "2", and "3", described above, is executed. By executing this processing, the cache data of the second fast mode blocks of the NAND #0 and the NAND #1 are transferred to the cache, and the erase process on these areas of the NAND #0 and the NAND #1 is completed.

Although not mentioned in the above description, when an error has been detected during transfer of data, the read control 1115 switches the fast mode to the correct mode, and transfers the data again. Then, after the transfer of data in the fast mode block area has been terminated in the correct mode, the read control 1115 switches the correct mode to the fast mode, and performs processing of the next fast mode block.

Next, a description will be given of a method of power recovery process in the above-described disk array device.

Figure 7:
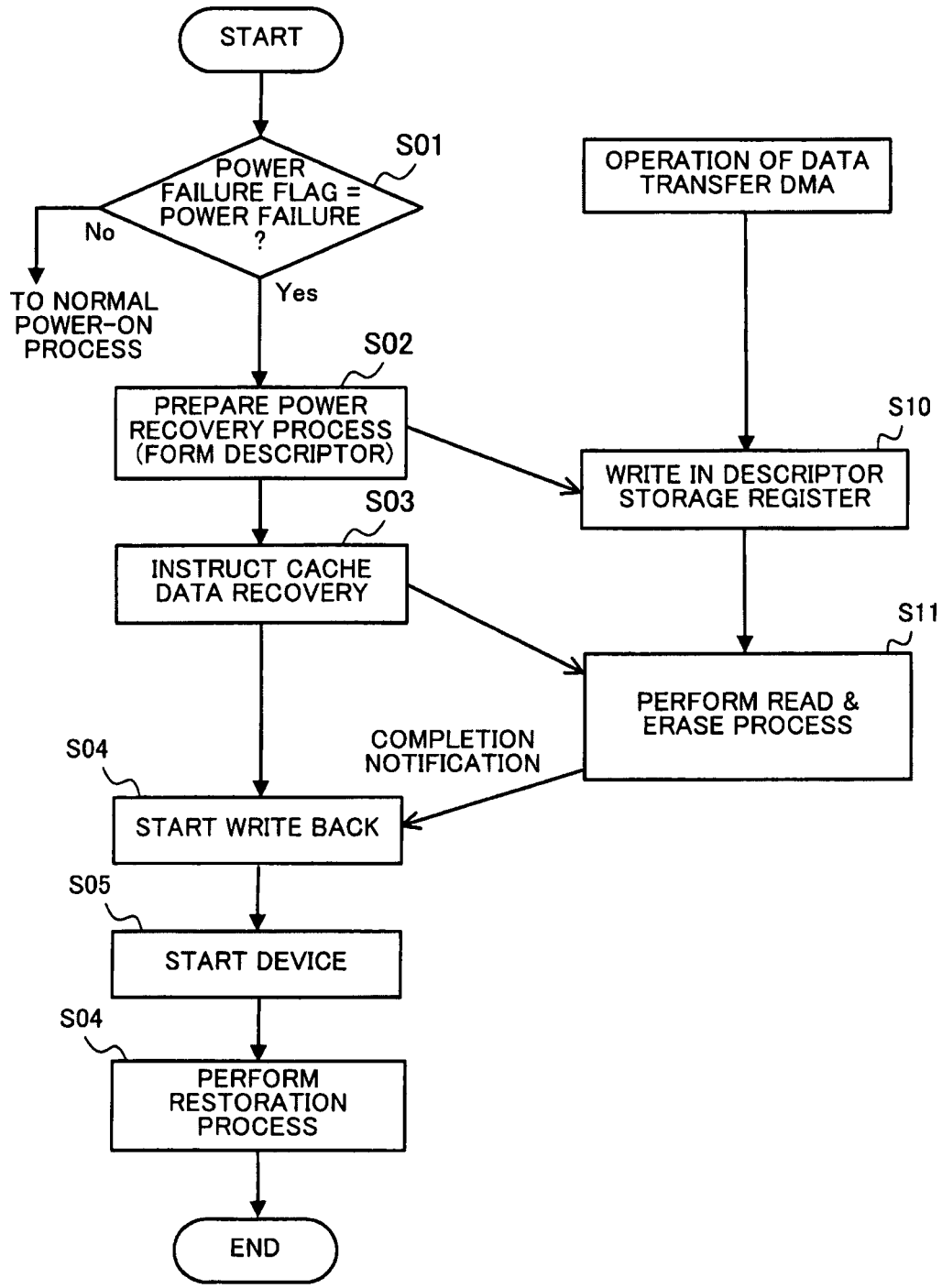
FIG. 7 is a flowchart of a method of a power recovery process for the entire device.

FIG. 7 is a flowchart of the method of the power recovery process for the entire device. The flowchart illustrates operation on the controller (RoC 140) side.

The disk array device recovers from a power failure, and the present process is started.

(Step S01) The controller (RoC 140) checks a power failure flag, and determines whether or not the device has recovered from a power failure. If a power failure occurs, the power failure flag is set to "power failure" at the time of occurrence of the power failure. The power failure flag is set in a non-volatile memory, not illustrated. Therefore, when the power of the disk array device is turned on, by consulting the power failure flag, the controller (RoC 140) can determine that the power recovery process is to be performed. If the device has recovered from a power failure, the process proceeds to a step S02. If the device has not recovered from a power failure, a normal power-on process is executed. Although not illustrated in FIG. 7, in the normal power-on process, the disk array device is immediately started without performing cache data recovery process.

(Step S02) If the device has recovered from a power failure, preparation for the power recovery process is made. More specifically, a descriptor is formed and notified to the data transfer DMA 110.

(Step S03) After forming the descriptor, the controller instructs the read & erase DMA 111 of the data transfer DMA 110 to perform the cache data recovery process. Then, a completion notification from the read & erase DMA 111 is awaited.

(Step S04) Upon receipt of the completion notification from the read & erase DMA 111, to execute a host I/O request process by write back, the host I/O request process is set to a write-back mode. In the read & erase DMA 111, the cache data recovery process and the erase process for erasing the NAND are simultaneously executed. Therefore, when the completion notification is received, the disk array device is in a state where it can start the power failure process immediately if a power failure occurs again. This makes it possible to cause the request process from the host I/O to be executed by write back.

(Step S05) A process for starting the disk array device is completed to place the disk array device in a ready state. This enables the normal operation of the disk array device.

(Step S06) A restoration process for writing cache data in the disk devices is performed. As described above, at the time point when the completion notification has been received from the read & erase DMA 111, the disk array device is in the state where it can start the power failure process immediately, and hence the restoration process can be thus executed after completion of starting of the disk array device.

The power recovery process is executed by the above-described processing procedure. The read & erase DMA 111 of the data transfer DMA 110 sequentially executes the read process and the erase process in parallel, and hence there is no need for the controller to instruct the start of the read process and the erase process each time. This makes it possible to reduce interventions by the controller in which a computer performs processing by executing programs. In general, processing involving software takes longer time than processing by hardware. Therefore, by reducing processing by the controller, it is possible to further increase the speed of the cache data recovery process.

Next, operations on the side of the data transfer DMA 110 (the read & erase DMA 111) will be described. Upon receiving information of the descriptor from the controller, the read & erase DMA 111 writes the information in the descriptor storage register 114 (step S10). Then, upon receiving an instruction for restoring cache data, the read & erase DMA 111 starts a read and erase process, described hereinafter (step S11). The read and erase process increases the speed of the data transfer processing using the fast mode and executes the read process and the erase process in parallel.

Hereinafter, the read and erase process will be described. For simplicity of explanation, first, a description will be given of data transfer in a combination mode in which data is transferred while switching between the fast mode and the correct mode, and then a description will be given of parallel execution of the read process and the erase process. In the present embodiment, the combination mode and parallel execution of the read process and the erase process are employed in combination. In the following description, the read & erase DMA 111 is referred to as the "r/e DMA 111".

(1) Data Transfer Processing in Combination Mode

The data transfer processing in the combination mode will be described with sequential reference to FIGS. 8 to 10. In a mode switching process, since there is no need to distinguish between the NAND #0 and the NAND #1, they are collectively illustrated in FIGS. 8 to 10.

Further, in the description, the NAND #0 and the NAND #1 are referred to as the "NAND 131".

Figure 8:
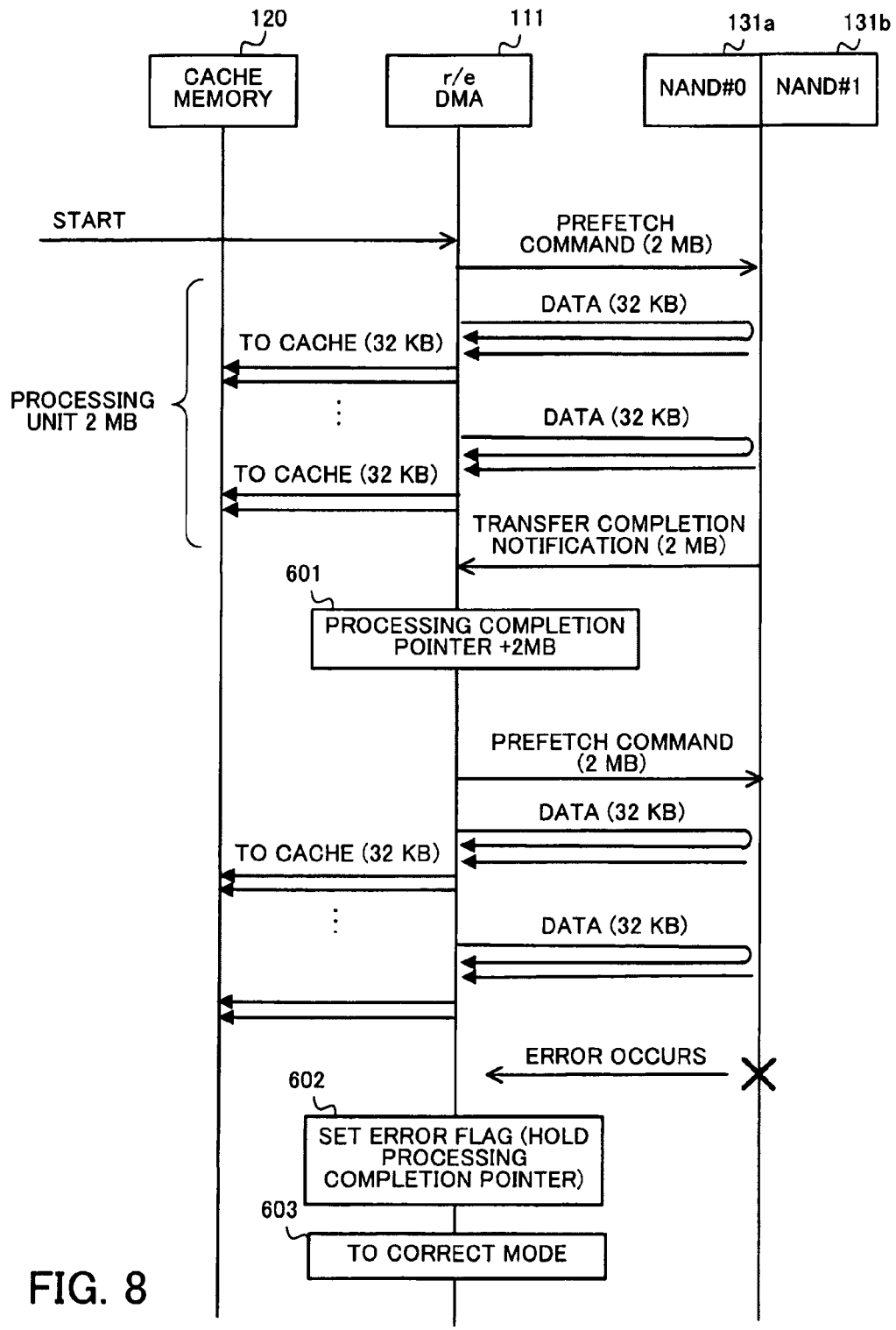
FIG. 8 illustrates a flow of processing from starting an operation in the fast mode to switching to the correct mode.

FIG. 8 illustrates the flow of processing from the start of the operation in the fast mode to the switching of the fast mode to the correct mode.

The result of selection between the fast mode and the correct mode is stored in a memory as a transfer mode, for example. Further, the prefetch amount may be stored in place of the transfer mode. The initial value of the transfer mode is set to the fast mode.

The controller instructs the r/e DMA 111 to start the cache data recovery process. Since the transfer mode is the fast mode, the r/e DMA 111 outputs a prefetch command specifying the prefetch amount (2 MB) of the fast mode to the NAND 131.

Then, the read in the fast mode is started. In the fast mode, the read data unit of data for reception from the NAND 131 is 32 KB, so that the read data (32 KB) is transferred to the buffer 1114. Since the write data unit of data for transmission to the cache is also 32 KB, the data in the buffer 1114 is written in the cache memory 120 as it is. Then, next data of the read data unit for reception is transferred from the NAND 131 to the buffer 1114, and is further transferred to the cache memory 120 via the buffer 1114. If no data transfer error has occurred, the operation is repeatedly and sequentially performed until the amount of transferred data becomes equal to the prefetch amount of 2 MB. After the amount of transferred data has become equal to 2 MB, a transfer completion notification (2 MB) is sent from the NAND 131. The r/e DMA 111 advances a processing completion pointer by 2 MB (601), and sets the same in the NAND address 1112. That is, in actuality, the processing completion pointer indicative of data addresses for which the processing has been completed indicates the start address of a data block to be processed or being processed.

After that, data transfer processing for transferring data of the next fast mode block is started. Now, let it be assumed that an error has been detected during transfer of the data. Although occurrence of an error can be detected during data transfer in the fast mode, it is difficult to identify the location of an error where the error has occurred and correct the error. In response to an error notification, the r/e DMA 111 sets an error flag (602). At this time, the processing completion pointer is not advanced due to the occurrence of the error, but remains held. Then, the fast mode is switched to the correct mode (603). The transfer mode set to the fast mode is rewritten into the correct mode.

Figure 9:
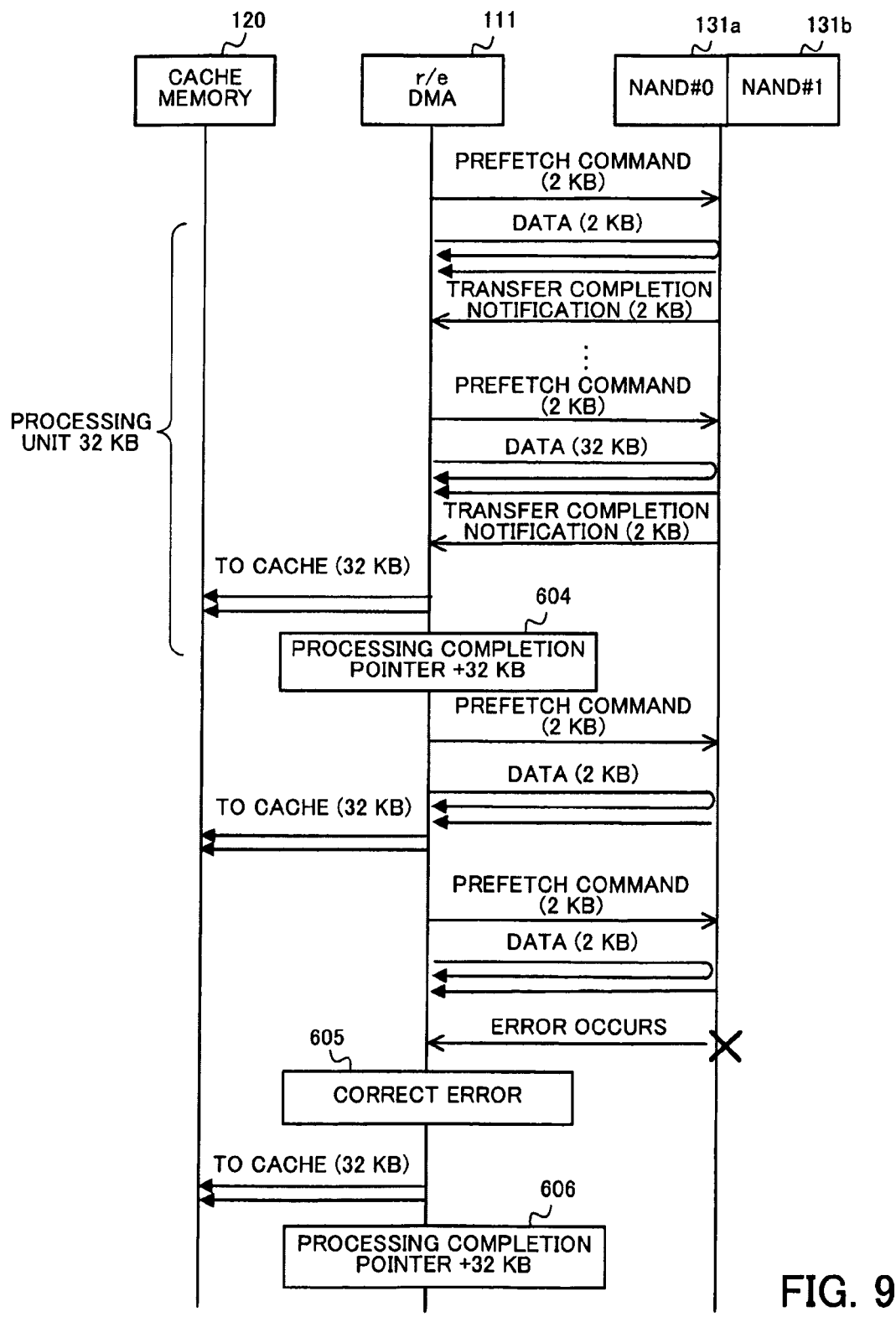
FIG. 9 illustrates a flow of an error correction process in the correct mode.

FIG. 9 illustrates the flow of an error correction process in the correct mode.

Due to the occurrence of the error, the transfer mode is switched to the correct mode by the above-described procedure. Since the processing completion pointer has not been advanced, the processing completion pointer indicates the start of the fast mode block where the error has occurred. This causes data transfer in the correct mode to be started from the leading end of the fast mode block where the data transfer error has occurred.

Since the transfer mode is the correct mode, the r/e DMA 111 instructs the NAND 131 to send a prefetch command (the prefetch amount=2 KB) in the correct mode. Then, the r/e DMA 111 starts reading of data in the correct mode. In the correct mode, the read data unit of data for reception from the NAND 131 is 2 KB, so that the read data (2 KB) is transferred to the buffer 1114 and is stored therein. After termination of the data transfer, a transfer completion notification (2 KB) is issued from the NAND 131. The r/e DMA 111 sets a prefetch command (2 KB), and reads out the next data of 2 KB. The r/e DMA 111 repeatedly and sequentially carries out this operation. When the amount of data stored in the buffer 1114 has become equal to 32 KB, the r/e DMA 111 writes cache data in the buffer 1114 in the cache memory 120. Then, the r/e DMA 111 advances the processing completion pointer by 32 KB (604). Through processing thus far, the cache data having a unit data amount of 32 KB in the correct mode is transferred to the cache memory 120.

Next, similarly, using an address indicated by the processing completion pointer advanced by 32 KB as the start address, transfer of data of the read data unit of 2 KB for reception from the NAND is repeatedly carried out. When an error has occurred during the data transfer, the r/e DMA 111 corrects the error using a redundant code added to the data (605). Data received from the NAND 131, including the corrected data, is transferred to the buffer 1114. When the amount of data stored in the buffer 1114 has become equal to 32 KB, the r/e DMA 111 writes cache data in the buffer 1114 in the cache memory 120. Then, the r/e DMA 111 advances the processing completion pointer by 32 KB (606). Through the processing thus far, the cache data having a unit data amount of 32 KB in the correct mode and including the corrected data is transferred to the cache memory 120.

Figure 10:
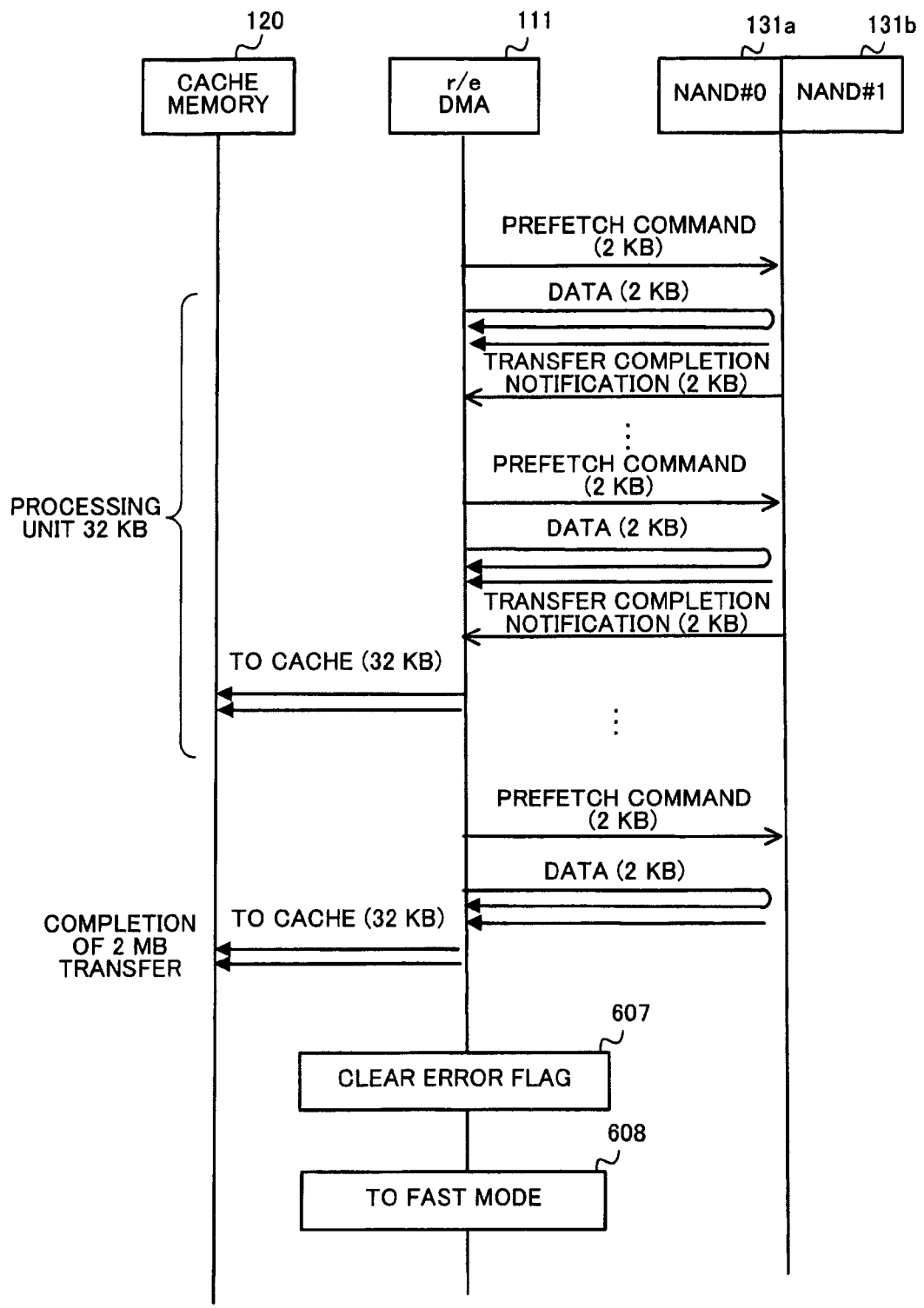
FIG. 10 illustrates a flow of processing executed until the correct mode is switched to the fast mode.

FIG. 10 illustrates the flow of processing executed until the correct mode is switched to the fast mode.

Next, in the same manner, using an address indicated by the processing completion pointer advanced by 32 KB as the start address, transfer of data of the read data unit of 2 KB for reception from the NAND is repeatedly carried out. Then, whenever the amount of data in the buffer 1114 becomes equal to 32 KB, cache data in the buffer 1114 is written in the cache memory 120, and the processing completion pointer is advanced by 32 KB.

Thus, when the transfer of data of 2 KB, which is the prefetch amount in the fast mode, is completed, the error flag is cleared (607), and the settings of the transfer mode in the read process are rewritten to those of the fast mode (608).

After that, the process returns to the FIG. 8 processing procedure, and the data transfer in the fast mode is continued unless an error is detected.

By executing the above-described processing procedure, the read process is executed in the fast mode in which the prefetch amount is large, thereby enabling a high-speed data transfer. Only when an error has been detected, the read process is executed for an area where the error has been detected, in the correct mode that can correct the error. This makes it possible to increase the speed of the read process, and positively restore cache data.

(2) Parallel Execution of Reading and Erasing

Figure 11:
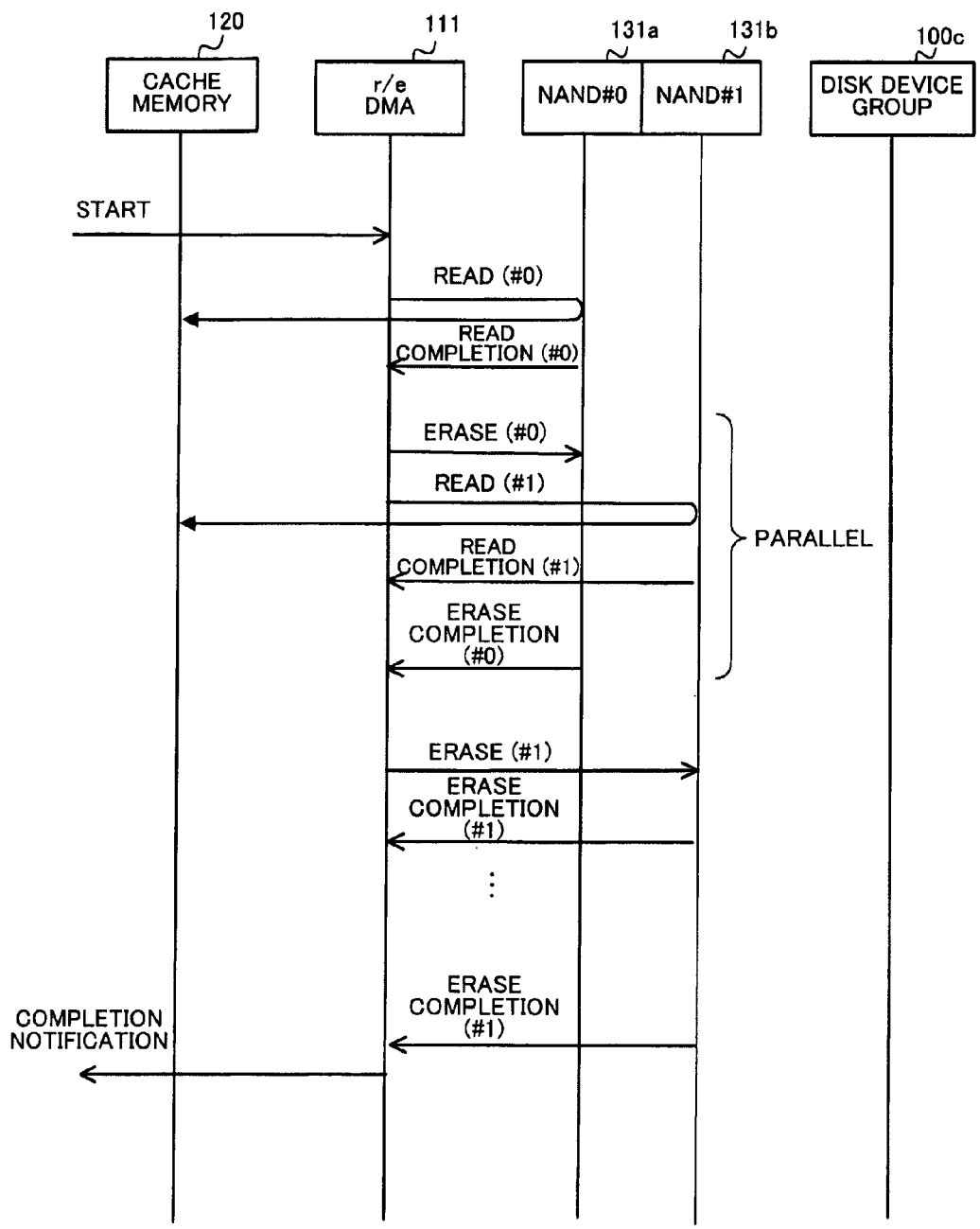
FIG. 11 illustrates a procedure of a parallel execution process for reading and erasing.
Figure 12:
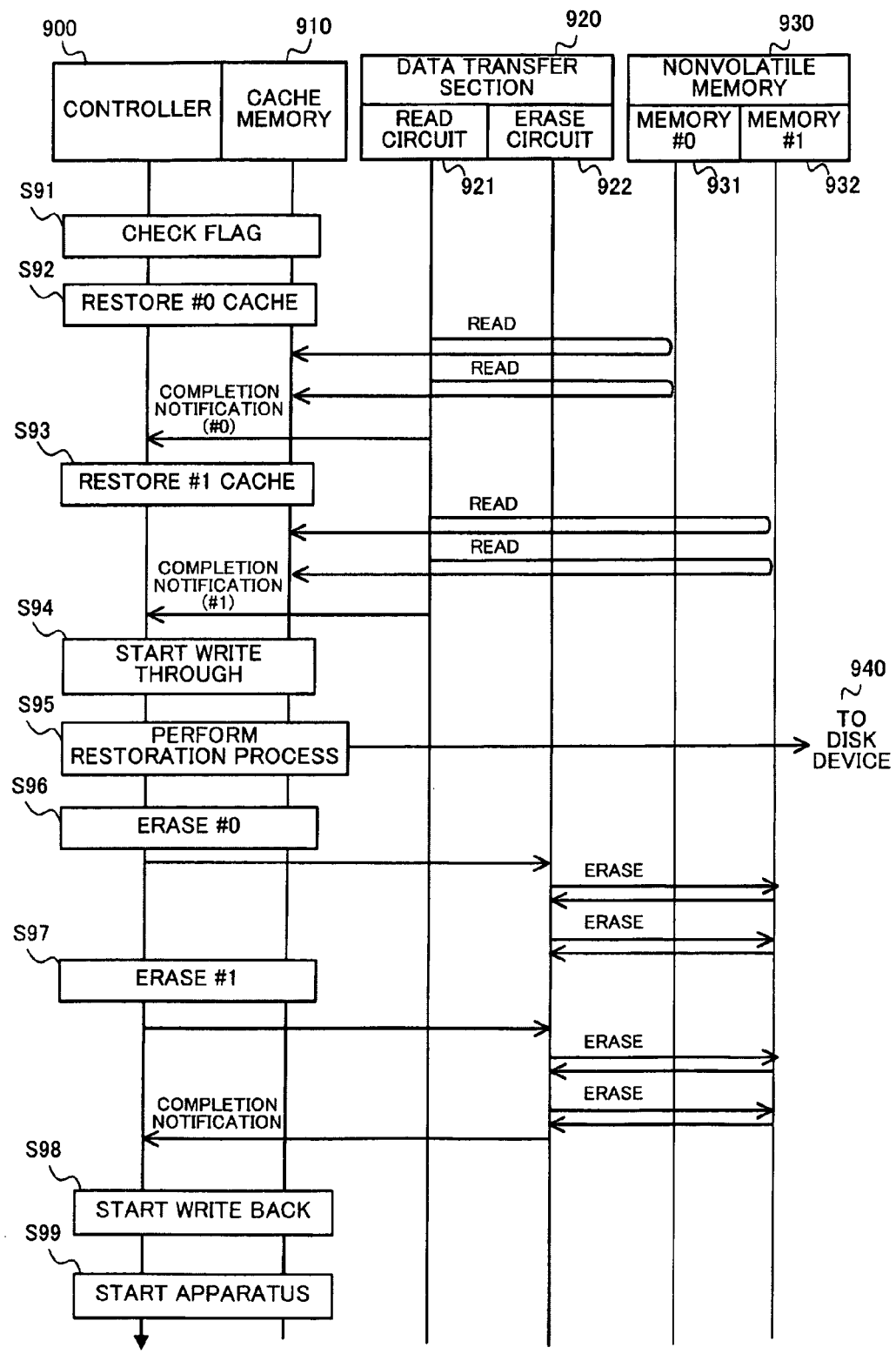
FIG. 12 illustrates a flow of a conventional power recovery process.

Next, a description will be given of the parallel execution of reading and erasing. FIG. 11 illustrates the procedure of a parallel execution process for reading and erasing.

The controller instructs the r/e DMA 111 to start the cache data recovery process. The r/e DMA 111 selected the NAND #0 (131*a*), and sets the fast mode to start the read process. The selector 1113 connects the buffer 1114, the read control 1115, and so forth, to the side of the NAND #0 (131*a*), for starting the read control 1115. When the data transfer of the prefetch amount is completed, a notification notifying completion of the read process (read completion (#0)) is output from the NAND #0 (131*a*).

Upon receipt of the read completion (#0), the r/e DMA 111 switches the selector 1113 to connect the buffer 1114 and the read control 1115 to the NAND #1 (131*b*). The selector 1113 connects the erase control 1116 to the NAND #0 (131*a*). In this state, the read control 1115 and the erase control 1116 are started. The read control 1115 reads out cache data from the NAND #1 (131*b*), and performs control for writing the cache data in the cache memory 120. On the other hand, the erase control 1116 performs the erase process for an area of the NAND #0 (131*a*) from which the cache data has already been read. The read control 1115 and the erase control 1116 operate in parallel. The r/e DMA 111 waits until it receives a read completion (#1) and an erase completion (#0). Upon receiving the read completion (#1) and the erase completion (#0), the r/e DMA 111 switches the selector 1113 to connect the erase control 1116 to the NAND #1 (131*b*). The r/e DMA 111 starts the erase control 1116 for causing the erase control 1116 to perform the erase process for an area of the NAND #1 (131*b*) from which cache data has already been read.

Upon receiving an erase completion (#1) notifying completion of the erase process for a final area, the r/e DMA 111 outputs a completion notification to the controller.

By executing the above-described processing procedure, cache data of the fast mode blocks in the NAND #0 (131*a*) and the NAND #1 (131*b*) are written back in the cache memory 120, and corresponding areas of the NAND #0 (131*a*) and the NAND #1 (131*b*) are erased. Further, when an error has occurred, and the fast mode has been switched to the correct mode, the same processing is performed in processing units of the correct mode.

At a time point when the controller has received the completion notification from the r/e DMA 111, both the read process and the erase process have been completed. Further, an erase completion address has been notified to the write DMAs 116*a* and 116*b*. Therefore, when a power failure has occurred again during the reading, the write DMAs 116*a* and 116*b* are capable of performing the cache data saving process for saving cache data up to the erase completion address.

By executing the above-described processing procedure, it is possible to execute the read process and the erase process in parallel. This makes it possible to reduce time necessary for the processing compared with the conventional cache data recovery process in which the read process and the erase process are sequentially performed.

According to the controller of the disclosed disk array device, the data transfer device thereof, and the method of the power recovery process, the reading of cache data from a nonvolatile memory and the erasing of the nonvolatile memory are carried out in parallel in the power recovery process upon recovery from a power failure. Further, data transfer sizes used at the time are set as deemed appropriate. This makes it possible to reduce time necessary for the power recovery process, thereby reducing the rise time of the disk array device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A controller for a disk array device, for recovering data stored in a cache memory, upon recovery from a power failure, comprising:
a nonvolatile memory configured to include a plurality of access ports, and have cache data written and stored therein which is stored in the cache memory at a time of occurrence of the power failure; and
a data transfer section which comprises:
a reading unit configured to read the cache data stored in said nonvolatile memory in units of a predetermined data transfer size and write the cache data back in the cache memory,
an erasing unit configured to erase data stored in said nonvolatile memory, and
a control unit configured to be operable when recovery from the power failure is detected, to perform a power recovery process in which said control unit specifies different ones of said access ports for said reading unit and said erasing unit, respectively, thereby causing said reading unit and said erasing unit to operate in parallel, and sets the predetermined data transfer size as appropriate according to a state of occurrence of an error during data transfer by said reading unit, such that the cache data is restored in the cache memory.

2. The controller according to claim 1, wherein said control unit specifies, for said erasing unit, one of said access ports, which is different from one set for said reading unit and is associated with an area of the nonvolatile memory for which a read process for reading therefrom by said reading unit has been completed, and instructs said erasing unit to perform an erase process for erasing the area of the nonvolatile memory for which the read process has been completed.

3. The controller according to claim 2, wherein the nonvolatile memory is formed by at least a pair of memory areas which are associated with different ones of said access ports, respectively, and have common addresses set for accessible areas thereof, and
wherein said control unit specifies said different access ports and a common processing start address for said reading unit and said erasing unit, to thereby cause said reading unit and said erasing unit to start to operate.

4. The controller according to claim 3, wherein said control unit comprises a selection unit configured to be operable when one of said access ports associated with the pair of memory areas is assigned to one of said reading unit and said erasing unit, to automatically select the other of said access ports for the other of said reading unit and said erasing unit to which the one of said access ports is not assigned.

5. The controller according to claim 3, wherein said control unit performs the read process and the erase process in succession on each processing block of said pair of memory areas having the common addresses set therefor, said processing block being dependent on the predetermined data transfer size, and after the cache data in a part of said memory area corresponding to said processing block is restored and said part of said memory area is erased, performs the read process and the erase process on a next processing block.

6. The controller according to claim 3, wherein said control unit causes the read process and the erase process to be executed on the area of the nonvolatile memory sequentially from a start address thereof, and when both the read process and the erase process have been completed, notifies a processing completion address together with a completion notification, thereby making it possible to perform a data saving process on the area up to the processing completion address when a power failure has occurred again.

7. The controller according to claim 1, wherein said reading unit comprises a first data transfer mode in which a data transfer size is set according to a data length according to which a redundant code is added which enables, when an error has occurred during the data transfer, identification of an error location where the error has occurred, and transfer of the cache data is executed while performing the identification of the error location where the error has occurred, and a second data transfer mode in which a data transfer size larger than the data transfer size of the first data transfer mode is set, and the data transfer of the cache data is performed while detecting only whether or not an error has occurred, and wherein said control unit causes said reading unit to operate in the second data transfer mode, and when an error has occurred during data transfer, switches the second data transfer mode to the first data transfer mode, thereby causing data in an area where the error has occurred during the data transfer in the second data transfer mode to be transferred in the first data transfer mode.

8. The controller according to claim 7, wherein after the second data transfer mode is switched to the first data transfer mode, if the transfer of the data in the area where the error occurred during the data transfer in the second data transfer mode is normally terminated, said control unit switches the first data transfer mode to the second data transfer mode to cause data in a next area to be transferred in the second data transfer mode.

9. A data transfer device for restoring data stored in a nonvolatile memory at a time of occurrence of a power failure, in a cache memory, upon recovery from the power failure, comprising:

a reading unit configured to read, from the nonvolatile memory configured to include a plurality of access ports and have cache data written therein which was stored in the cache memory at the time of occurrence of the power failure, the cache data in units of a predetermined data transfer size, and write the cache data back in the cache memory;

an erasing unit configured to erase data stored in the nonvolatile memory; and a control unit configured to be operable when recovery from the power failure is detected, to perform a power recovery process in which said control unit specifies different ones of said access ports for said reading unit and said erasing unit, respectively, thereby causing said reading unit and said erasing unit to operate in parallel, wherein during the power recovery process, said control unit sets the predetermined data transfer size as appropriate according to a state of occurrence of an error during data transfer by said reading unit, such that the cache data is restored in the cache memory.

10. A method of a power recovery process for restoring data stored in a nonvolatile memory at a time of occurrence of a power failure, in a cache memory, upon recovery from the power failure, comprising:

outputting, when recovery from the power failure is detected, a read instruction for reading, from the nonvolatile memory including a plurality of access ports and having cache data written therein which was stored in the cache memory at the time of occurrence of the power failure, the cache data in units of a predetermined data transfer size, by specifying one of the access ports, and an erase instruction for erasing the nonvolatile memory, by specifying another of the access ports;

reading the cache data stored in the nonvolatile memory, based on the read instruction, in units of the predetermined data transfer size, using the one of the access ports specified in the read instruction, and writing the cache data back in the cache memory;

erasing an area of the nonvolatile memory in parallel with said reading, based on the erase instruction, using the another of the access ports specified in the erase instruction; and setting the data transfer size as appropriate according to a state of occurrence of an error in data transfer by said reading.

\* \* \* \* \*